(12) United States Patent
Berggren et al.

(10) Patent No.: US 11,963,018 B2
(45) Date of Patent: Apr. 16, 2024

(54) BEAM MANAGEMENT IN DISCONNECTED MODE

(71) Applicant: SONY GROUP CORPORATION, Tokyo (JP)

(72) Inventors: Anders Berggren, Lund (SE); Rickard Ljung, Helsingborg (SE); Basuki Priyanto, Lund (SE); Nafiseh Mazloum, Lund (SE)

(73) Assignee: Sony Group Corporation, Tokyo (JP)

( * ) Notice: Subject to any disclaimer, the term of this patent is extended or adjusted under 35 U.S.C. 154(b) by 226 days.

(21) Appl. No.: 17/280,090

(22) PCT Filed: Oct. 25, 2019

(86) PCT No.: PCT/EP2019/079174
§ 371 (c)(1),
(2) Date: Mar. 25, 2021

(87) PCT Pub. No.: WO2020/089072
PCT Pub. Date: May 7, 2020

(65) Prior Publication Data
US 2021/0409973 A1    Dec. 30, 2021

(30) Foreign Application Priority Data

Oct. 31, 2018   (SE) .................................... 1830315-6

(51) Int. Cl.
*H04W 76/28* (2018.01)
*H04L 5/00* (2006.01)
*H04W 24/02* (2009.01)

(52) U.S. Cl.
CPC ........... *H04W 24/02* (2013.01); *H04L 5/0048* (2013.01); *H04L 5/0053* (2013.01); *H04W 76/28* (2018.02)

(58) Field of Classification Search
CPC ............ H04W 12/02; H04W 74/0816; H04W 74/0866; H04W 68/02; H04W 60/04;
(Continued)

(56) References Cited

U.S. PATENT DOCUMENTS 10,630,429 B2 *  4/2020  Jung .................... H04L 1/1812
2017/0251518 A1   8/2017  Agiwal et al.
(Continued)

FOREIGN PATENT DOCUMENTS

EP   3301995 A1   4/2018
EP   3337055 A1   6/2018
(Continued)

OTHER PUBLICATIONS

"International Search Report and Written Opinion of the International Searching Authority", International Application No. PCT/EP2019/079174, dated Dec. 20, 2019, 10 pp.
(Continued)

*Primary Examiner* — Iqbal Zaidi
(74) *Attorney, Agent, or Firm* — Myers Bigel, P.A.

(57) ABSTRACT

A method of operating a wireless communication device (90) includes monitoring for signals from a communications network (100, 101, 109) in a connected mode (301) of the wireless communication device (90) with a receive beam configuration (401). The method also includes storing the receive beam configuration (401) and monitoring for further signals (4003-4005) from the communications network (100, 101, 109) in a disconnected mode (302, 303) of the wireless communication device (90) with the stored receive beam configuration (401).

16 Claims, 12 Drawing Sheets

(58) Field of Classification Search
CPC ........ G06F 21/64; G06K 7/10; H04B 7/0639; H04B 17/345
See application file for complete search history.

(56) References Cited

U.S. PATENT DOCUMENTS

| | | |
|---|---|---|
| 2018/0167883 A1 | 6/2018 | Guo et al. |
| 2019/0268061 A1* | 8/2019 | Li .......................... H04B 17/17 |
| 2020/0059867 A1* | 2/2020 | Haghighat .......... H04W 52/367 |

FOREIGN PATENT DOCUMENTS

| | | |
|---|---|---|
| GB | 201714552 | 10/2017 |
| WO | 2017196219 A1 | 11/2017 |
| WO | 2018174767 A1 | 9/2018 |

OTHER PUBLICATIONS

3GPP, "3rd Generation Partnership Project; Technical Specification Group Radio Access Network; NR; Radio Resource Control (RRC) protocol specification (Release 15)", TS 38.331 V15.3.0, Sep. 2018, 445 pp.

Interdigital, Inc., "Overhead reduction techniques for NR paging based on beam sweeping", 3GPP TSG RAN WG1 Meeting #91, R1-1720549, Agenda Item 7.1.3, Reno, U.S.A., Nov. 27, 2017, 6 pp.

* cited by examiner

BEAM MANAGEMENT IN DISCONNECTED MODE

CROSS REFERENCE TO RELATED APPLICATIONS

This application is a 35 U.S.C. § 371 national stage application of PCT International Application No. PCT/EP2019/079174, filed on Oct. 25, 2019, which itself claims the benefit of and priority to Swedish Application No. 1830315-6, filed on Oct. 31, 2018, the contents of both of which are incorporated herein by reference in their entirety. The above-referenced PCT International Application was published in the English language as International Publication No. WO 2020/089072 A1 on May 7, 2020.

TECHNICAL FIELD

Various examples generally relate to operating a wireless communication device in a disconnected mode. Various examples specifically relate to beam management while operating the wireless communication device in the disconnected mode.

BACKGROUND

Wireless communication using wireless communication devices (sometimes also referred to as terminals or user equipment, UE) is widespread. It is a concern to reduce energy consumption at the UE. It is a further concern to efficiently utilize the available electromagnetic spectrum.

To reduce energy consumption, it is known to implement a discontinuous reception (DRX) at the UE. Here, a DRX cycle includes ON-durations and OFF-durations. During the ON-durations, receiver circuitry of the UE is in an active state. During the OFF-durations, the receiver circuitry can be shut down or generally operated in a low-power state. The power consumption of the receiver circuitry is thus lower during the OFF-durations than during the ON-durations. Typically, the receiver circuitry is unfit to receive signals during the OFF-durations. Since the timing of the DRX is aligned between the UE and an access node of a communications network, it is possible to communicate between the UE and the access node during the ON-durations of the DRX cycle. By using the DRX, the power consumption is reduced.

Sometimes, the DRX can be combined with operation of the UE in a disconnected mode. Examples include Third Generation Partnership (3GPP) Radio Resource Control (RRC)_Idle and RRC_Inactive mode. Here, a data connection between the UE and the communications network may be disconnected. For example, corresponding context parameters may be discarded (in RRC_Idle) or buffered for later reuse when resuming communication (in RRC_Inactive). See 3GPP TS 38.331, Version 15.3.0 (2018-09). By disconnecting the data connection, it becomes possible to further reduce the power consumption.

To efficiently utilize the electromagnetic spectrum, beamforming techniques can be employed. Here, an antenna array is used to transmit and/or receive (communicate) signals with directivity. For this, multiple antennas of the antenna array are operated in a phase-coherent manner to implement constructive and destructive interference for preferred and non-preferred directions, respectively. Thereby, beams are defined. Then, high carrier frequencies can be used and spatial multiplexing becomes possible. When employing beamforming, it is typically required to align a transmit (TX) beam and a receive (RX) beam. The corresponding routine is referred to as beam management. Sometimes, as part of beam management, beamsweeps are performed: here, multiple TX beams and/or RX beams are used for transmitting and/or attempting to receive/receiving (monitoring for) signals. Then, while certain TX beams and/or RX beams may be associated with degraded communication performance, others may provide for reliable and robust communication performance. Using beamsweeps, it becomes also possible to sound various channels of a wireless link between the UE and the access node (channel measurements).

It has been observed that beam management can result in a significant power consumption at the UE.

SUMMARY

Therefore, a need exists for advanced techniques of beam management, specifically for energy-efficient beam management in disconnected mode.

This need is met by the features of the independent claims. The features of the dependent claims define embodiments.

A method of operating a UE includes monitoring for signals from a communications network in a connected mode of the UE, with a receive beam configuration. The method also includes monitoring for further signals from the communications network in a disconnected mode of the wireless communication device with the receive beam configuration. The method also includes monitoring for further signals from the communications network in a disconnected mode of the wireless communication device with the receive beam configuration.

The receive beam configuration may be stored, e.g., when operating in the connected mode.

A computer program product or a computer program or a computer-readable storage medium includes program code that can be executed by a processor. Executing the program code causes the processor to perform a method of operating a UE. The method includes monitoring for signals from a communications network in a connected mode of the UE, with a receive beam configuration. The method also includes monitoring for further signals from the communications network in a disconnected mode of the wireless communication device with the receive beam configuration. The method also includes monitoring for further signals from the communications network in a disconnected mode of the wireless communication device with the receive beam configuration.

A UE is configured to monitor for signals from a communications network in a connected mode of the UE, with a receive beam configuration. The UE is also configured to monitor for further signals from the communications network in a disconnected mode of the wireless communication device with the receive beam configuration. The UE is also configured to monitor for further signals from the communications network in a disconnected mode of the wireless communication device with the receive beam configuration.

For instance, a respective control circuitry of the UE can be configured to perform these actions. The control circuitry may be implemented by analog circuitry and/or digital circuitry. For example, a processor may be used.

A method of operating a node of a communications network includes receiving an indicator from a UE. The indicator is indicative of the UE using a receive beam configuration during a connected mode and a disconnected mode of the UE. The method also includes setting a paging configuration for transmitting paging signals to the UE, depending on the indicator. The method also includes triggering the transmission of the paging signals to the UE in accordance with the paging configuration.

A method of operating a node of a communications network includes exchanging, with a UE, information on a use of a receive beam configuration of the UE during a connected mode and a disconnected mode of the UE.

A computer program product or a computer program or a computer-readable storage medium includes program code that can be executed by a processor. Executing the program code causes the processor to perform a method of operating a node of a communications network, which method includes receiving an indicator from a UE. The indicator is indicative of the UE using a receive beam configuration during a connected mode and a disconnected mode of the UE. The method also includes setting a paging configuration for transmitting paging signals to the UE, depending on the indicator. The method also includes triggering the transmission of the paging signals to the UE in accordance with the paging configuration.

A computer program product or a computer program or a computer-readable storage medium includes program code that can be executed by a processor. Executing the program code causes the processor to perform a method of operating a node of a communications network, which method includes exchanging, with a UE, information on a use of a receive beam configuration of the UE during a connected mode and a disconnected mode of the UE.

A node is configured to receive an indicator from a UE. The indicator is indicative of the UE using a receive beam configuration during a connected mode and a disconnected mode of the UE. The node also includes to set a paging configuration for transmitting paging signals to the UE, depending on the indicator. The node is also configured to trigger the transmission of the paging signals to the UE in accordance with the paging configuration.

A node is configured to exchange, with a UE, information on a use of a receive beam configuration of the UE during a connected mode and a disconnected mode of the UE.

For example, the node can be an access node of a communications network such as a base station of a cellular network. The node could also be a mobility-control node of a communications network, e.g., a mobility-control node of a core of a cellular network.

A method of operating a UE includes, in response to transitioning the UE from operation in a connected mode to operation in a disconnected mode: monitoring for signals from a communications network with a receive beam configuration; and, in response to occurrence of at least one predefined event: monitoring for the signals from the communications network with a further receive beam configuration that is at least partly different from the receive beam configuration.

The receive beam configuration may or may not be different from another receive beam configuration used by the UE when operating in the connected mode.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
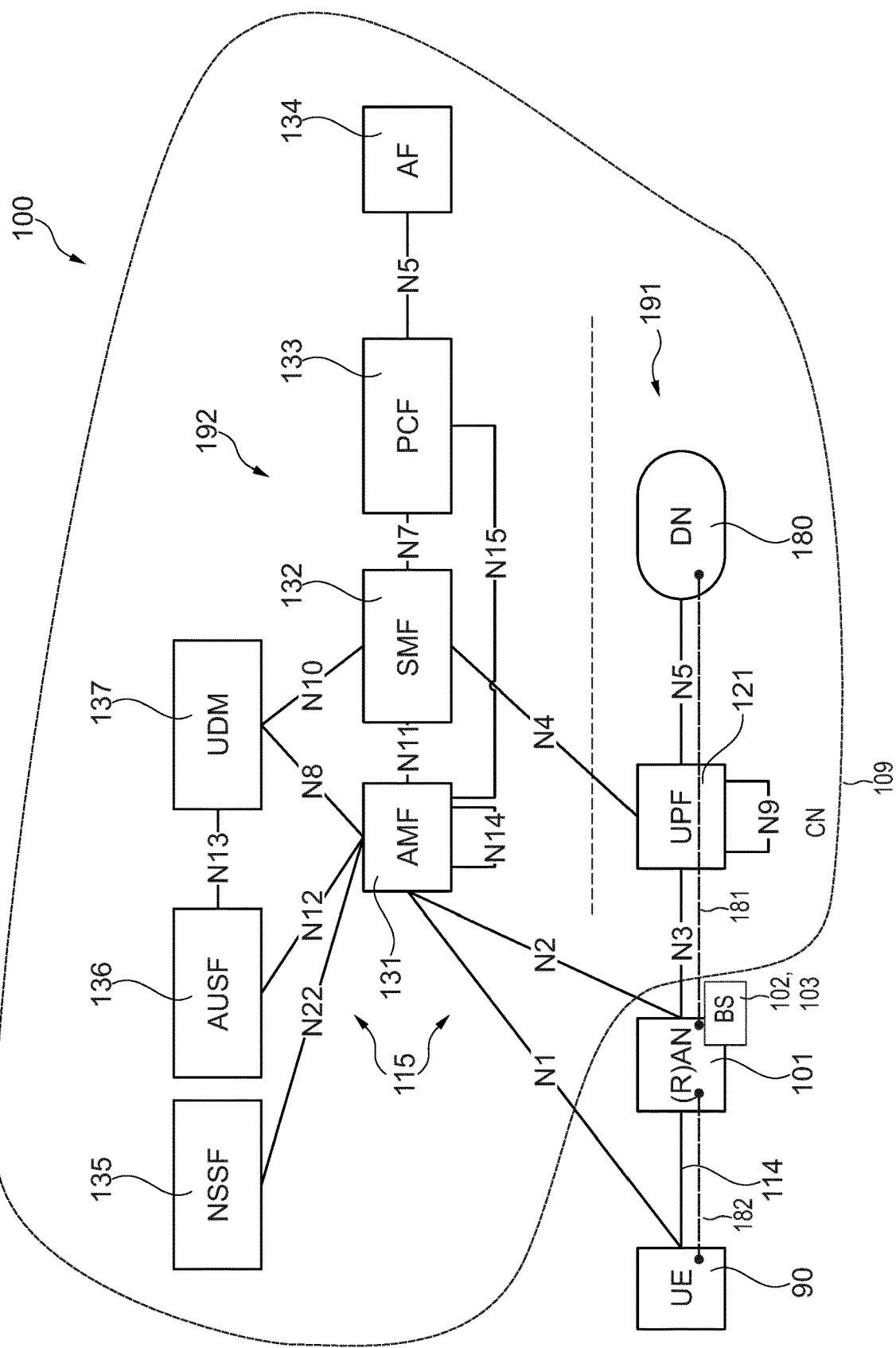
FIG. 1 schematically illustrates a cellular network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

Hereinafter, techniques of wirelessly communicating using a communications network are described. The communications network may be a wireless network. For sake of simplicity, various scenarios are described hereinafter with respect to an implementation of the communications network by a cellular network. The cellular network includes multiple cells. Each cell corresponds to a respective sub-area of the overall coverage area. Other example implementations include Institute of Electrical and Electronics Engineers (IEEE) WLAN network, MulteFire, etc.

Hereinafter, techniques of reducing energy consumption at the UE are described. Specifically, techniques are described which enable efficient implementation of DRX. Thereby, the time that receiver circuitry of the UE is required to operate in an active state is reduced; hence, the energy consumption of the UE can be reduced. Also, the techniques facilitate operating the UE in a disconnected mode in which a data connection is not maintained active.

The techniques described herein may facilitate using an appropriate beam configuration at the UE when operating in the disconnected mode. Specifically, the beam management may be simplified when operating in the disconnected mode according to various examples described herein. For example, it may be possible to avoid or at least postpone energy-costly beamsweeps.

According to various examples, it is possible to inherit a beam configuration used when operating in connected mode, to also be used by the UE when operating in a disconnected mode. Using the beam configuration, the UE can monitor for one or more signals, e.g., a paging signal and/or a reference signal.

The beam configuration may define the use and non-use of certain beams. The beam configuration may define the use of a beamsweep. As a general rule, different beams may be defined by different antenna weights—i.e., different amplitude and phase relationships between antennas of an antenna array. Different beams can have a different orientation and/or beam width. The beam configuration may define a beam width and/or beam orientation of one or more beams. The beam configuration may define a sequence of multiple beams. The beam configuration may define a strength of certain beams. The beam configuration may define one or more beams by defining the respective antenna weights of each respective beam. The beam configuration may define the use/non-use of certain antenna panels, each antenna panel including one or more phase-coherently coupled antennas. The beam configuration may define a timing of use of multiple respective beams with respect to each other.

Such beam configuration inheritance may greatly simplify the beam management in the disconnected mode. For instance, it may not be required to perform a beamsweep when re-using the beam configuration already used in the connected mode.

Such techniques are based on the finding that UE mobility typically occurs on a certain timescale, e.g., minutes. Then, it is possible to re-use the beam configuration used by the UE when operating in connected mode at least in the beginning when operating in a disconnected mode, e.g., until a predefined event occurs.

Specifically, such techniques may have certain benefits when being applied in a cellular network according to the 3GPP New Radio (NR) 5G framework. Here, the UE may use DRX in RRC_Idle and RRC_Inactive modes, in order to reduce the power consumption. The UE monitors for reference signals (RSs) and/or paging signals in one or more paging occasions (PO) per DRX cycle. The POs are time-aligned with the ON-durations of the DRX cycle. Typically, the BS will use a TX beam configuration where RSs and/or paging signals are transmitted on multiple TX beams within one PO. A TX beamsweep may be defined.

The UE can monitor for the RSs to measure a receive strength and quality, e.g., in the 3GPP framework the synchronization signal (SS) RS Received Power (RSRP) or the SS-RS Received Quality (RSRQ). A cell selection or re-selection between multiple available cells may be based on such channel measurements using RSs transmitted by the multiple available cells. Sometimes, the number of RSs per time-frequency resource block varies depending on the frequency range.

In principle, an RX beam configuration including multiple RX beams may be employed by the UE. For example, in the PO, the UE may potentially use a certain RX beam configuration which uses multiple RX beams time-aligned with the TX beamsweep of the TX beam configuration of the BS. For instance, for 3GPP NR: for frequency bands below 3 GHz, there can be up to four time-frequency blocks carrying RSs within a burst set on up to four TX beams; for frequency bands between 3 GHz and 6 GHz, there can be up to eight time-frequency resource blocks carrying RSs within a burst set on up to eight TX beams; and for higher-frequency bands there can be up to 64 time-frequency blocks carrying RSs within a burst set on up to 64 TX beams. This gives the UE the flexibility to use an appropriate RX beam configuration.

For both frequency ranges <3 GHz and 3 GHz to 6 GHz, if receiver diversity is in use by the UE, the reported SS-RSRP value shall not be lower than the corresponding SS-RSRP of any of the individual receiver branches. For example, a receiver branch can provide for receiver diversity. For instance, each receiver branch may include analog circuitry such as an amplifier and/or a phase shifter.

From the above, it is apparent that the RX beam configuration using multiple RX beams can cause significant energy consumption. Also, checking for various receiver branches can cause a higher UE energy consumption, as well as higher signaling load.

For these reasons, the beam inheritance described herein facilitates an efficient and simplified beam management at the UE when operating in the disconnected mode. By means of the beam inheritance, flexibility is added to the receiver operation at the UE and monitoring for signals during a PO is simplified. The channel measurement procedure for one or more cells can be simplified by the beam inheritance.

According to various examples, the UE stores information about the active beam configuration and initializes a timer (T), e.g., a beam validity timer, before it transitions from RRC_CONNECTED to RRC_IDLE or RRC_INACTIVE state.

Within a certain time-period before the beam validity timer expires (y<T), the UE then re-uses the stored beam configuration used during RRC_Connected when monitoring for signals, e.g., when performing channel measurements for serving cell evaluation by monitoring for RSs or when monitoring for paging signals during the PO. Here, the benefit is that the UE does not need to go through the entire RX beamsweep, but instead re-uses the stored beam configuration for SS-RSRP/SS-RSRQ measurement and/or the monitoring for paging signals. This consequently reduces the time duration of SS-RSRP/SS-RSRQ measurement and monitoring for paging signals and thereby reduces the UE power consumption.

Whenever the beam validity timer has expired (y>T), the UE may still attempt to continue re-using the stored RX beam configuration used during RRC_Connected. For example, the UE may perform a channel measurement using the stored RX beam configuration: The UE may monitor for RSs with the stored RX beam configuration. If the measurement results fulfill the requirements for re-using the stored RX beam configuration, e.g., requirements on signal quality and/or strength, the UE may re-initialize the beam validity timer and continue to monitor, e.g. for a paging signal, based on the stored beam configuration. On the other hand, the UE may activate another beam configuration—e.g., including more beams than the stored beam configuration and implementing a beamsweep—for further paging signal monitoring and/or channel measurement for cell evaluation if the channel measurement does not meet the requirements, e.g., for N consecutive times, wherein N=1, 2, 3, . . . . depending on the implementation.

The timer value of the beam validity timer (i.e., the time period between initialization and expiry) may be selected based on one or more decision criteria. For example, the UE mobility status, i.e., if the UE is a stationary or a low-mobility device may be an example decision criterion. For instance, a longer timer value can be used for a UE having lower mobility compared to a UE with higher mobility. For example, the mobility state evaluation may be based on number of cell reselections (1 to 16) during a defined time period (30 to 240 sec), see 3GPP TS 38.331 Version 15.3.0. Another example decision criterion includes an orientation of the UE. For instance, if the orientation of the UE changes often, then the timer value may be set smaller than if the orientation of the UE changes less often. Yet another decision criterion can include a configuration received from the cellular network. Thus, the value may be at least partly network-configured.

As a general rule, it would be possible that (i) the use of the beam configuration inheritance and, optionally, (ii) one or more parameters of the beam configuration inheritance such as the value of the beam validity timer are aligned between the UE and the cellular network such that, both, the UE and the cellular network have synchronized knowledge on the UE operation in disconnected mode. Hence, respective information on (i) the use of the beam configuration inheritance and/or (ii) the one or more parameters may be exchanged. This may involve uplink control messages and/or downlink control messages. For example, a two-way negotiation may be employed. As a general rule, (i) the use of the beam configuration inheritance may be activated or deactivated by decision logic residing at the cellular network; or the UE. Likewise, (ii) the configuration of the beam configuration inheritance may be determined by decision logic residing at the cellular network; or the UE.

To give an example where the UE implements the respective decision logic: here, the UE can indicate that the beam configuration used during disconnected mode will be inherited from the connected mode, i.e., the UE may transmit an indicator indicative of the use of the stored receive beam configuration when monitoring for signals in the disconnected mode. The UE may transmit an indicator indicative of the timer value, e.g., as part of a two-way negotiation process of the timer value and/or along with a mobility indication (e.g., low, medium, and high).

In a scenario of network-configuration of the (i) use of the beam configuration inheritance and/or (ii) the configuration of the beam configuration inheritance, also various decision criteria can be used. In some examples, one or more default values for the beam validity timer may be used in case no UE-specific value is used. In case multiple values are defined, a criterion can be defined per timer value. Typical criteria could be based on the number of conducted cell changes (handovers or idle mode reselections) over a given time period, i.e., generally UE mobility. For instance, a stationary UE (e.g. wall mounted), could use another value, highest number, based on its fixed location. Yet another decision criterion could be based on UE movement (using an inertial measurement UE), indicating UE orientation/rotation and hence need for switching beam, i.e. relaxed monitoring is based on UE rotation.

As mentioned above, there can be a possibility for the network to configure a UE specific timer value. The network can configure a UE specific timer value, e.g. with RRC signaling.

There is a risk that a UE fails performing the channel measurement, thus unable to receive the paging. In order to improve the system robustness, the paging configuration can be appropriately adapted, along with the used RX beam configuration. For example, a UE that re-uses the stored RX beam configuration from RRC_Connected can be configured to be paged M-times, with M>1. Thus, in case the UE misses the first paging attempt, the UE can still have M−1 attempts. On the other hand, the paging configuration can be changed upon using another beam configuration, e.g., so that the UE is paged L-times, where L<M.

Alternatively or additionally to adjusting the paging configuration along with the used RX beam configuration, it would be possible to adjust the DRX at the UE depending on the used RX beam configuration. For example, the ON-durations of the DRX may be shortened when using the stored RX beam configuration inherited from connected mode if compared to when using a fallback RX beam configuration after occurrence of the predefined event. For instance, the one or more RX beams of the stored RX beam configuration inherited from the connected mode may be time-aligned with a subset of all TX beams of the TX beam configuration used by the BS to transmit, e.g., RSs and/or paging signals. In another example, it would also be possible to use the one or more RX beams of the stored RX beam configuration inherited from the connected mode to monitor signals on all TX beams of the TX beam configuration used by the BS to transmit, e.g., RSs and/or paging signals.

FIG. 1 schematically illustrates a cellular network 100 that may be employed in the various examples described herein. The example of FIG. 1 illustrates the network 100 according to the 3GPP NR 5G architecture. Details of this architecture are described in 3GPP TS 23.501, version 1.3.0 (2017-09). While FIG. 1 and further parts of the following description illustrate techniques in the 3GPP 5G framework of a cellular network, similar techniques may be readily applied to other communication protocols and communications networks. Examples include 3GPP LTE 4G—e.g., in the MTC or NB-IOT framework—and even non-cellular wireless systems, e.g., an IEEE Wi-Fi technology.

In the scenario of FIG. 1, a UE 90 is connectable to the cellular network 100. For example, the UE 90 may be one of the following: a cellular phone; a smart phone; and IOT device; a MTC device; etc. The UE 90 may be stationary or non-stationary.

The UE 90 is connectable to the network 100 via a RAN 101, typically formed by one or more BSs 102, 103. A wireless link 114 is present between the RAN 101—specifically between one or more of the BSs 102, 103 of the RAN 101—and the UE 90. The wireless link 114 may include multiple spatial propagation channel that can be selectively addressed by beamforming.

The RAN 101 is connected to a core network (CN) 109. The CN 109 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121, along a CN tunnel 181. In the scenario of FIG. 1, the UPF 121 acts as a gateway towards a data network 180, e.g., the Internet or a Local Area Network. Application data can be communicated between the UE 90 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: registration management; Non-Access Stratum termination; connection management; reachability management; mobility management; access authentication; and access authorization. For example, the AMF 131 controls CN-initiated paging of the UEs 90 if the respective UE 90 operates in RRC_Idle mode. In a scenario where the UE 90 operates in RRC_Inactive, paging is handled by the RAN 101.

A RAN connection 182 may be established between the UE 90 and the RAN 101. For example, the RAN connection 182 may include a signal radio bearer (SRB) and/or a data radio bearer (DRB). The SRB can be mapped to the common control channel of the wireless link 114 during establishment of the RAN connection; upon establishment of the RAN connection, a dedicated control channel of the wireless link 114 may be set-up. For example, RRC control signaling may be implemented on the SRB. The DRB may be used for payload data such as application layer data. This RAN connection 182 is characterized by a UE context information, e.g., defining security parameters, etc. The RAN connection 182 is established if the UE 90 operates in a connected mode, e.g., RRC_Connected; i.e., the RAN connection 182 is not established in a disconnected mode such as RRC_Idle and RRC_Inactive. Here, the UE context information may be deleted or suspended.

To keep track of the current mode of the UE 90, the AMF 131 sets the UE 90 to Evolved Packet System Connection Management (ECM) connected or ECM idle. During ECM connected, a non-access stratum (NAS) connection is maintained between the UE 90 and the AMF 131. The NAS connection implements an example of a mobility control connection. The NAS connection may be set up in response to paging of the UE 90. The AMF 131 assumes that the NAS connection is still established, since the N2 tunnel still remains and that the UE is in ECM Connected even when the UE is in RRC_Inactive.

The SMF 132 provides one or more of the following functionalities: session management including session establishment, modify and release, including tunnel setup of CN tunnels 181 between the RAN 101 and the UPF 121; selection and control of UPFs; configuring of traffic steering; roaming functionality; termination of at least parts of NAS messages related to session management; etc. As such, the AMF 131 and the SMF 132 both implement CP management needed to support a moving UE.

Figure 2:
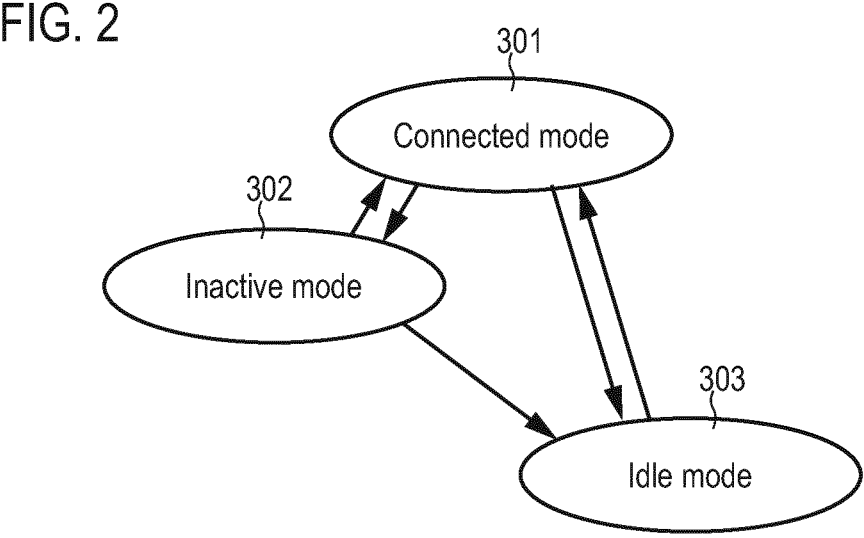
FIG. 2 schematically illustrates a connected mode and disconnected modes in which a UE can operate according to various examples.

FIG. 2 illustrates various modes 301-303 in which the UE 90 can operate according to various examples. The UE 90 can operate in such modes in the various examples described herein. The inactive mode 302—e.g., corresponding to RRC_Inactive in the 3GPP 5G scenario—and the idle mode 303—e.g., corresponding to RRC_Idle—are disconnected modes.

In the disconnected modes 302, 303, there is no or limited possibility to implement transmission of payload data between the RAN 101 and the UE 90, because the RAN connection 182 is not established. Differently, the RAN connection 182 is established in the connected mode 301.

The context information of the UE 90 is maintained while the UE operates in the inactive mode 302, but is not maintained while the UE operates in the idle mode 303. Further, the core network tunnel 181 is maintained while the UE 90 operates in the inactive mode 302; but is not maintained while the UE operates in the idle mode 303.

In response to a need for transmitting DL data, the UE 90 may be paged; for this, the BSs 102, 103 of a tracking area or a RAN notification area (including multiple cells) can transmit paging signals at POs, e.g., according to a paging configuration. The paging may be controlled by the AMF 131 if the UE is in the idle mode 303, e.g., in a tracking area. Differently, the paging may be controlled by the RAN 101 while the UE is in the inactive mode 302, e.g., in a RAN notification area.

Figure 3:
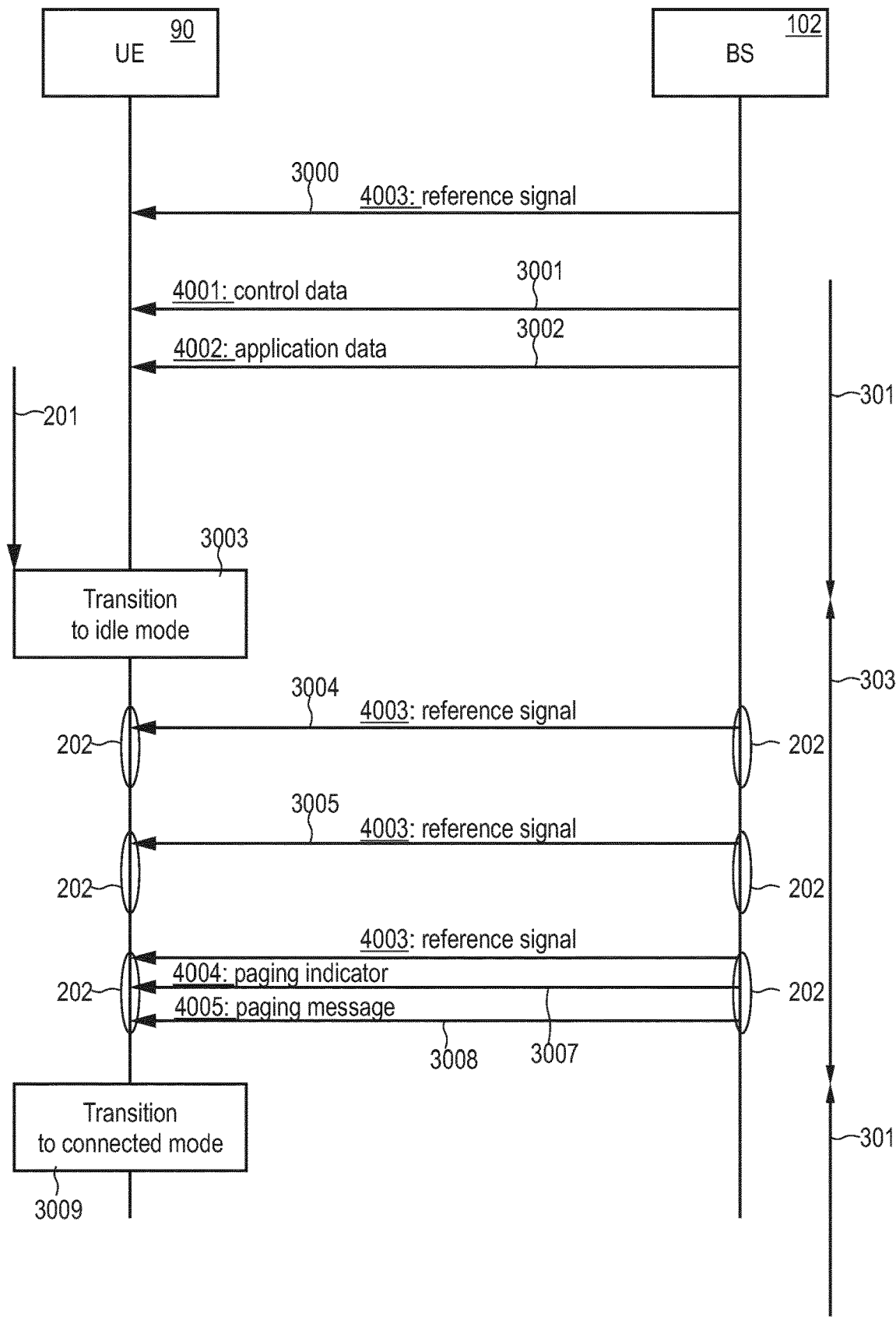
FIG. 3 is a signaling diagram schematically illustrating transition between the connected mode and a disconnected mode according to various examples.

FIG. 3 illustrates of transitioning between the connected mode 301 and the idle mode 303. Such transitioning may be applied in the various examples described herein. The techniques of FIG. 3 may be comparable to and applicable to techniques employed for transitioning between the connected mode 301 and the inactive mode 302. Further, FIG. 3 illustrates aspects with respect to paging the UE 90.

FIG. 3 is a signaling diagram of communication on the wireless link 114 between the UE 90 and the BS 102.

Figure 4:
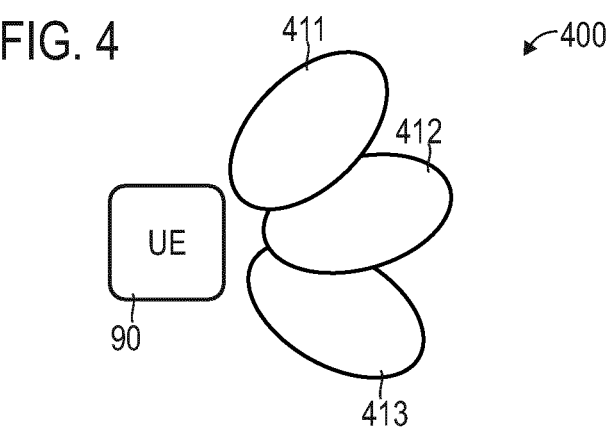
FIG. 4 schematically illustrates multiple RX beams of a RX beam configuration employed by the UE and monitoring for signals when operating in the disconnected mode according to various examples.

Initially, the UE 90 operates in connected mode 301. Here, at 3000, a DL RSs is transmitted by the BS 103, e.g., using multiple TX beams and a TX beamsweep (the beams and the beamsweep are not illustrated in FIG. 3). The RSs 4003 may be indicative of the respective TX beam. The UE 90 monitors for these DL RSs, e.g., also using multiple RX beams and an RX beamsweep (cf. FIG. 4 where a RX beamsweep 400 including RX beams 411-413 is illustrated). With continued reference to FIG. 3, the UE 90 receives, on one or more of the RX beams 411-413, the respective RS(s). Then, using a codebook approach, the UE 90 selects the appropriate RX beam 411-413 and optionally may report back to the BS 102. Thereby, an appropriate TX beam—RX beam pair may be identified. Such operation may be labelled beam management. As a general rule, there are also other options available for implementing the beam management, beyond the codebook approach described. For example, by using amplitude and phase of the DL RSs, channels on the wireless link 114 may be calculated, e.g., using matrix inversion. In any case, the beam management yields an appropriate RX beam configuration for the UE, the RX beam configuration defining one or more RX beams to use.

Then, at 3001, downlink (DL) control data 4001 is transmitted by the BS 102 and received by the UE 90, using the determined beam configuration. For example, an RRC control message may be used to communicate the control data 4001. It would be possible to transmit a network configuration to the UE 90 using the DL control data 4001, e.g., pertaining to a configuration of beam configuration inheritance or the like.

At 3002, DL application-layer data 4002—also referred to as user data or payload data—is transmitted by the BS 102 and received by the UE 90, again using the determined beam configuration. It would be possible that the DL control data 4001 and the DL application data 4002 are both communicated on a physical DL shared channel (PDSCH) where resources are allocated by the BS 102 to multiple UEs. Alternatively, the DL control data 4001 may be communicated on a physical DL control channel (PDCCH). The RAN connection 182 is employed to communicate the data 4001, 4002.

While in FIG. 3 DL data 4001, 4002 is illustrated, uplink (UL) data can be communicated, as well, e.g., on a physical UL shared channel (PUSCH) and/or a physical UL control channel (PUCCH) (not shown in FIG. 3).

Then, there is no more data to be communicated employing the RAN connection 182. Eventually, an associated inactivity timer 201 expires and triggers the transition from the connected mode 301 to the idle mode 303, at 3003. At this time, the RAN connection 182 is released, e.g., using RRC control signaling (not illustrated in FIG. 3).

Upon transitioning into operation in the idle mode 303, a DRX is activated. The UE 90 time-aligns the ON-durations of the DRX cycle with POs 202. In FIG. 3, only at the third PO 202, the paging indicator 4004 is transmitted by the BS 102 and received by the UE 90, 3007. At 3008, the BS 102 transmits a paging message 4005. The paging message 4005 is transmitted using the PDSCH, on resources indicated by the paging indicator 4004. The paging message 4005 can be indicative of an identity of the UE 90. Then, in response to receiving the paging message 4005, the UE 90 transitions into the connected mode, 3009. This involves establishment of the RAN connection 182. For establishing the RAN connection 182, a random access procedure including transmission of a UL random access preamble can be employed.

Figure 5:
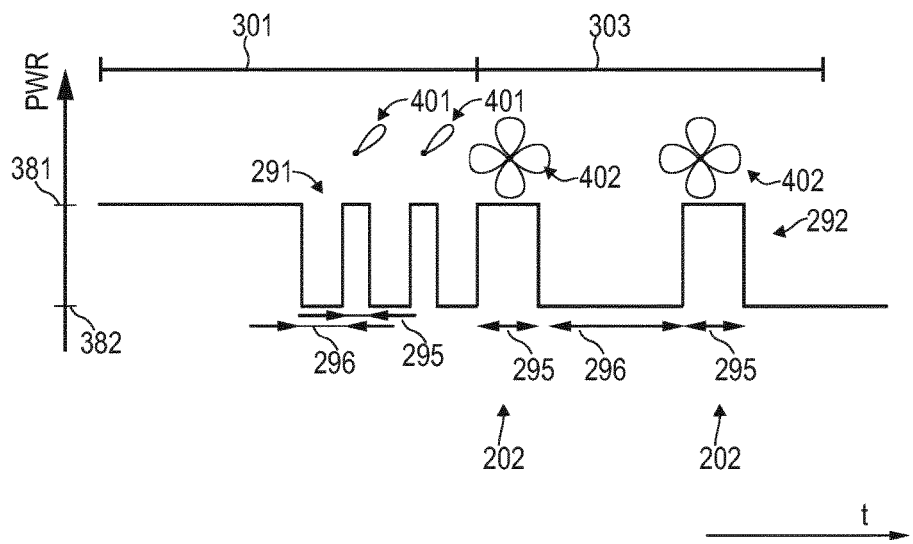
FIG. 5 schematically illustrates using a first RX beam configuration when operating in the connected mode and using a different, second RX beam configuration when operating in the disconnected mode.

FIG. 5 illustrates aspects with respect to beam management in the idle mode 303. Such techniques as described in connection of FIG. 5 may serve as reference implementations for benchmarking other techniques of beam management in the idle mode 303 as described herein. Moreover, techniques of beam management described in connection with FIG. 5 for idle mode 303 may be readily applied to other kinds and types of disconnected modes 302, 303, e.g., inactive mode 302.

FIG. 5 schematically illustrates the beam configuration over the course of time. Initially, while operating in the connected mode 301, a RX beam configuration 401 is used by the UE 90 to monitor for DL signals. For instance, as illustrated in FIG. 5, the RX beam configuration 401 may include a single one of the RX beams 411-413 (cf. FIG. 4).

The RX beam configuration 401 may be determined based on channel measurements by monitoring for DL reference signals 4003 (cf FIG. 3, step 3000).

Upon transitioning from the connected mode 301 to the idle mode 303 (cf. FIG. 3), a further RX beam configuration 402 is used to monitor for signals such as DL reference signals 4003 and paging signals 4004, 4005 during POs 202. As will be appreciated from the illustration of FIG. 5, the further RX beam configuration 402 includes more RX beams 411-413 than the RX beam configuration 401. The further RX beam configuration 402 may define an RX beamsweep on the respective RX beams 411-413. Details with respect to the RX beamsweep of the further RX beam configuration 402 are described in connection with FIG. 6.

Figure 6:
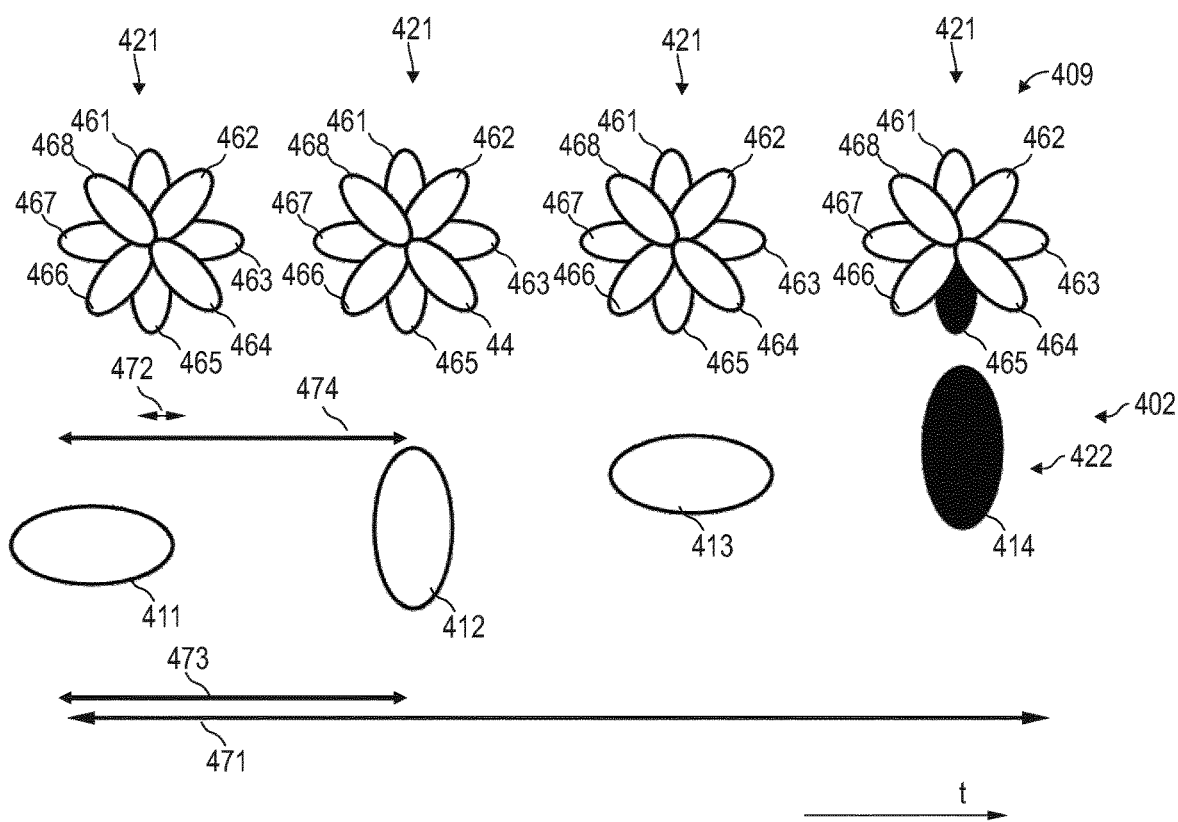
FIG. 6 schematically illustrates the second beam configuration used when operating in the disconnected mode according to FIG. 5.

FIG. 6 schematically illustrates aspects with respect to a further RX beam configuration 402 of the UE 90. In the example of FIG. 6, the further RX beam configuration 402 includes four RX beams 411-414, which may cover the surrounding of the UE 90 omni-directionally. A respective RX beamsweep 422 is defined by the further RX beam configuration 402. The RX beamsweep 422 first activates the RX beam 411, then the RX beam 412, then the RX beam 413, and the RX beam 414. Each RX beam 411-414 is active for a time duration 473, giving the overall time duration 471 for the RX beamsweep 422. In some example, time-multiplexing of the RX beams 411-414 may be possible.

FIG. 6 also schematically illustrates aspects with respect to a TX beam configuration 409 of the BS 102. In the example of FIG. 6, the TX beam configuration 409 includes eight TX beams 461-468. A respective TX beamsweep 421 is defined by the TX beam configuration 409. The TX beamsweep 421 first activates the TX beam 461, than the TX beam 462, and so on. Each TX beam 461-468 is active for a time duration 472 within the TX beamsweep 421. Thereby, the overall time duration 474 of the TX beamsweep 421 corresponds to the time duration 473 for which one of the RX beams 411-414 is active. In other words, the RX beamsweep 422 has a much longer duration 471 than the duration 474 of each individual TX beamsweep 421.

On the other hand, the TX beamsweep 421 is repeated multiple times, for each one of the RX beams 411-414. This helps to iteratively test each TX beam 461-468—RX beam 411-414 pair. As illustrated in the example of FIG. 6, the pair consisting of the TX beam 465 and the RX beam 414 is identified as suitable for communication between the BS 102 and the UE 90. This is achieved by the beam management using the further RX beam configuration 402.

Using the further RX beam configuration 402 requires significant energy. Specifically, due to the RX beamsweep 422, the UE 90 monitors for DL signals on all four RX beams 411-414. Furthermore, each individual RX beam 411-414 is active for a comparably long time duration 473, to accommodate for the entire TX beamsweep 421. Thus, as illustrated in FIG. 5, the DRX 292 used by the UE 90 during the idle mode 303 requires a DRX cycle having comparably long ON-durations 295, to accommodate for the RX beamsweep 422. This reduces the length of the OFF-durations 296 of the DRX 292. Since receiver circuitry of the UE 90 operates in an active state 381 during the ON-durations 295 and only operates in a low-power state 382 during the OFF-durations 296, the respective energy consumption is high.

In the scenario FIG. 5, the DRX 291 is also used in the connected mode 301, which is generally optional.

To reduce the energy consumption, the beam management in the idle mode 303 can be optimized. A corresponding scenarios is illustrated with respect to FIG. 7.

Figure 7:
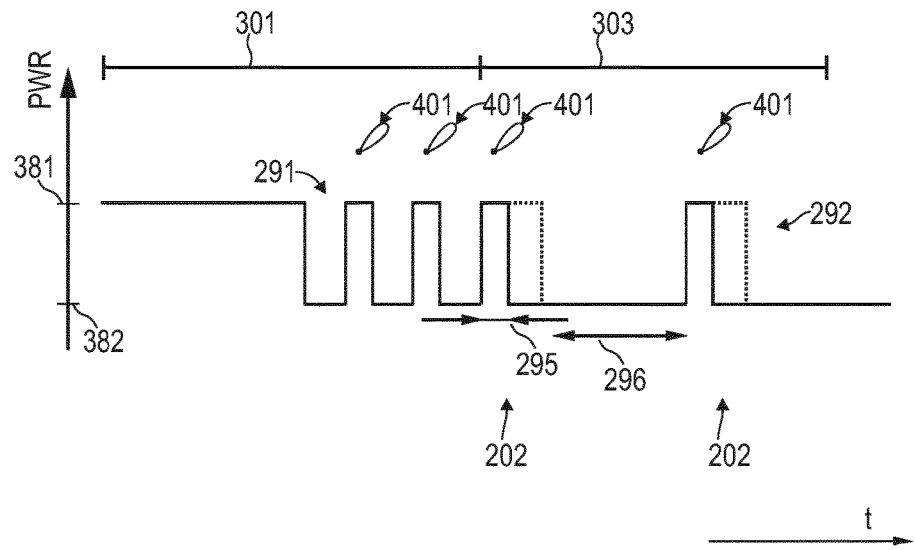
FIG. 7 schematically illustrates using a first RX beam configuration when operating in the connected mode and continue to use (inheriting) the first RX beam configuration when operating in the disconnected mode, according to various examples.

FIG. 7 illustrates aspects of beam management in the idle mode 303. Such techniques as described in connection of FIG. 7 may be applied in various examples described herein. Moreover, techniques of beam management described in connection with FIG. 7 for idle mode 303 may be readily applied to other kinds and types of disconnected modes 302, 303, e.g., inactive mode 302. In the example of FIG. 7, a stored RX beam configuration is used.

The example of FIG. 7 generally corresponds to the example of FIG. 5. However, in the example of FIG. 7, the RX beam configuration 401 used during connected mode 301 is stored and also used during the idle mode 303, in contrast to the reference example of FIG. 5. This means that the UE 90 monitors for DL signals—e.g., DL reference signals 4003 for channel measurements and/or DL paging signals 4004, 4005 such as the paging indicator 4004 and/or the paging message 4005 for paging—using the stored RX beam configuration 401 in the idle mode 303. The RX beam configuration 401 is inherited from the connected mode 301 to the idle mode 303. This has the effect that it is not required to perform the energy-inefficient RX beamsweep 422 (cf. FIG. 6) of the further RX beam configuration 402. Rather, a limited count of RX beams 411-414 may be employed for monitoring for the DL signals 4003-4005. Thus, the energy consumption can be reduced.

Specifically, the DRX 292 of the receiver circuitry of a wireless interface of the UE 90 can be configured appropriately when monitoring for the DL signals 4003-4005 using the RX beam configuration 401 inherited from the connected mode 301. Specifically, the DRX 292 can be configured based on the RX beam configuration 401. Optionally, the DRX 292 can also be configured based on the TX beam configuration 409. This facilitates shortening the ON-duration 295 of the DRX cycle of the DRX 292 (cf. dotted line in FIG. 7). Thereby, the OFF-duration 296 can be lengthened and the receiver circuitry of the UE 90 can operate in the low-power state 382 for a longer time, thereby reducing the energy consumption. Respective details are explained in connection with FIG. 8 below.

Figure 8:
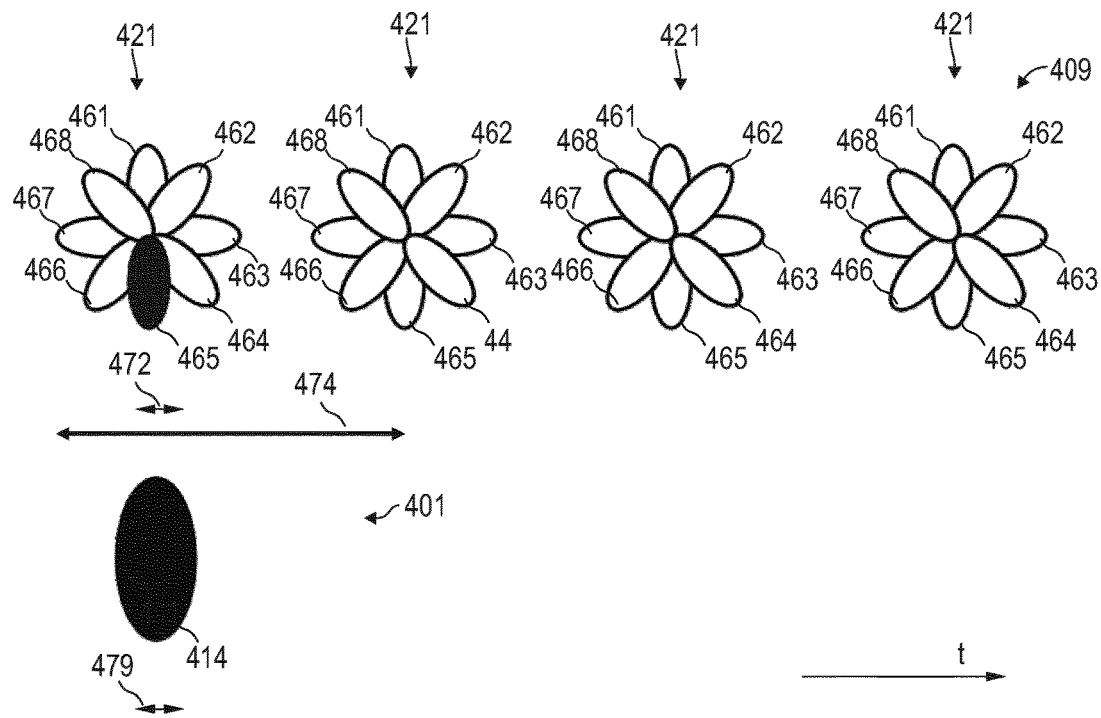
FIG. 8 schematically illustrates the first RX beam configuration used when operating in the disconnected mode according to FIG. 7.

FIG. 8 schematically illustrates aspects with respect to the RX beam configuration 401 of the UE 90 used for beam configuration inheritance. In the example of FIG. 8, the RX beam configuration 401 includes a single RX beam 414. The RX beam configuration 401 does not implement a beamsweep. All this reduces the power consumption at the UE 90. Specifically, the DRX 292 is configured such that the RX beam 414 of the RX beam configuration 401 is time-aligned with a subset of one or more of the TX beams 461-468 of the TX beamsweep 421 of the TX beam configuration 409. For example, it would be possible that the ON-duration 295 of the DRX 292 of the UE 90 is configured such that the UE 90 controls the receiver circuitry to monitor for DL signals 4003-4005 for a certain time duration 479 that corresponds to the time duration 472 of a respective single TX beam 465. This helps to significantly reduce the ON-duration 295 of the DRX 292 when using the RX beam configuration 401 during idle mode 303, specifically if compared to when using the further RX beam configuration 402 (cf. FIG. 5) during idle mode 303.

Due to the limited number of RX beams 414 of the RX beam configuration 401, the ability of the UE 90 to adapt to changing conditions of the wireless link 114 may be limited. For example, if the location of the UE 90 changes due to UE mobility or if the orientation of the UE 90 changes, then—referring to the example of FIG. 8—the RX beam 414 of the RX beam configuration 401 may not offer a reasonable communication quality, any more. According to various techniques, it is possible to tailor the use of the inherited RX beam configuration 401. Specifically, an event-driven constraint and/or a timing constraint may be defined. Corresponding examples are described in connection with FIG. 9.

Figure 9:
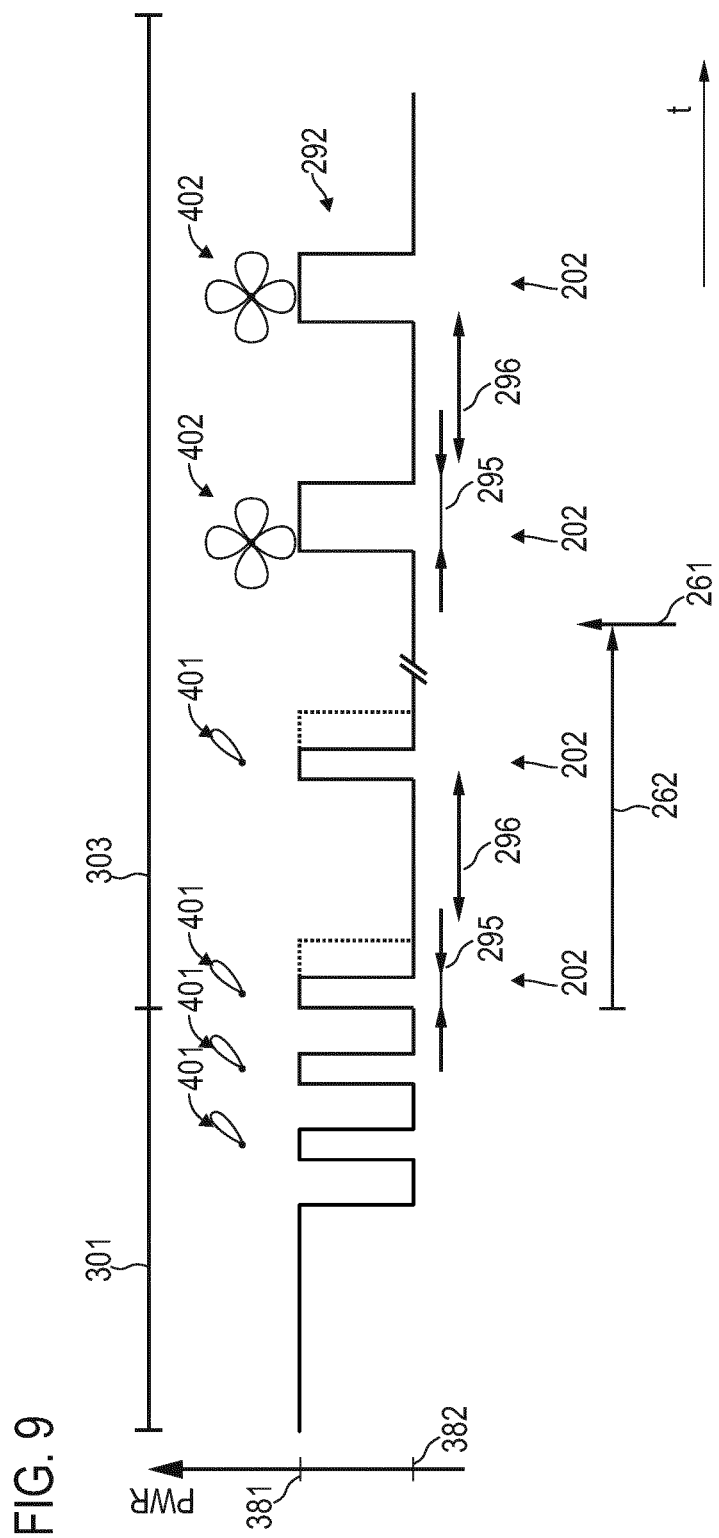
FIG. 9 schematically illustrates using a first RX beam configuration when operating in the connected mode and continue using the first RX beam configuration upon transitioning into the disconnected mode and using the second RX beam configuration after occurrence of a predefined event, according to various examples.

FIG. 9 illustrates aspects with respect to beam management in the idle mode 303. Such techniques as described in connection of FIG. 9 applied in various examples described herein. Moreover, techniques of beam management described in connection with FIG. 9 for idle mode 303 may be readily applied to other kinds and types of disconnected modes 302, 303, e.g., inactive mode 302.

The scenario of FIG. 9 generally corresponds to the scenario of FIG. 7: specifically, upon transitioning from the connected mode 301 to the idle mode 303, the UE 90 continues to monitor for DL signals 4003-4005 using the inherited RX beam configuration 401. This offers the benefit of a reduced ON-duration 295 and increased OFF-duration 296 of the DRX 292, as discussed above in connection with FIG. 7 and FIG. 8.

In the scenario FIG. 9, the UE 90 continues to monitor for DL signals 4003-4005 using the inherited RX beam configuration 401 in the idle mode 303 until occurrence of a predefined event 261. In the example of FIG. 9, the predefined event 261 includes expiry of a beam validity timer 262. The beam validity timer 262 is initialized upon transitioning from the connected mode 301 to the idle mode 303. After the predefined event 261, the UE 90 monitors for the DL signals 4003-4005 using the further RX beam configuration 402 (cf FIG. 5).

As is apparent from a comparison of FIG. 6 (illustrating the RX beam configuration 402) with FIG. 8 (illustrating the inherited RX beam configuration 401), the set of RX beams 411-414 of the further RX beam configuration 402 includes a larger count of beams (i.e., four RX beams 411-414 in the illustrated example) than the set of beams of the inherited RX beam configuration 401 (only including a count of a single RX beam 414 in the illustrated example). Thereby, by performing the fallback to the further RX beam configuration 402, the flexibility of the UE 90 to address changing conditions of the wireless link 114 is increased by using more RX beams 411-414.

Based on the finding that such a fallback may be required due to UE mobility, it would be possible to set the timer value of the beam validity timer 262 based on the mobility state of the UE 90 and/or based on an orientation state of the UE 90. Alternatively or additionally, it would also be possible that the UE 90 sets the timer value of the beam validity timer 262 based on a configuration received from the cellular network 100. Again, a node of the cellular network 100—e.g., the BS 102—may set the timer value based on the mobility state of the UE 90 and/or based on the orientation state of the UE 90. Specifically, such setting of the timer value may be performed while still operating the UE 90 in the connected mode 301 and before transitioning to one of the disconnected modes 302, 303, i.e., before initializing the beam validity timer 262. It would be possible that the UE 90 reports on the set timer value of the beam validity timer 262. I.e., the UE 90 may transmit an indicator indicative of the timer value of the beam validity timer 262 to the cellular network 100 while being in the connected mode 301. For example, an UL RRC control message may be used (as discussed in connection with FIG. 3, 3001).

In the example of FIG. 9, the configuration of the DRX 292 depends on the choice of the RX beam configuration 401, 402. As illustrated in FIG. 9, the ON-duration 295 of the DRX cycle of the DRX 292 is shorter prior to the occurrence of the predefined event 261, i.e., when monitoring for the DL signals 4003-4005 using the RX beam configuration 401, if compared to the ON-duration 295 of the DRX cycle of the DRX 292 after occurrence of the predefined event 261, i.e., when monitoring for the DL signals 4003-4005 using the further RX beam configuration 402. This has already been explained in connection with FIG. 6 and FIG. 8: by means of the extended ON-duration 295 of the DRX cycle of the DRX 292 after occurrence of the predefined event 261, it is possible to monitor for the DL signals 4003-4005 using a larger count of RX beams 411-414 of a RX beamsweep 422 of the further RX beam configuration 402, e.g., to monitor for DL signals 4003-4005 transmitted on all TX beams 461-468 employed by the BS 102.

Above, various examples have been described in which the predefined event 261 corresponds to expiry of the beam validity timer 262. As a general rule, it would be possible that the predefined event 261 is defined with respect to other characteristics than the beam validity timer 262. For instance, it would be possible that the predefined event 261 is defined with respect to a receive strength or a receive quality of the DL reference signals 4003 falling below a predefined threshold when monitoring for the DL reference signals 4003 with the inherited RX beam configuration 401. For example, the RSRP or RSRQ may be determined and compared with the predefined threshold. Such a technique helps to efficiently identify degradation of the communication quality using the limited set of one or more received beams of the inherited RX beam configuration 401.

In some examples, it is even possible to combine such different predefined events 261 with each other, e.g., in a hierarchical manner. The corresponding example is illustrated in connection with FIG. 10.

Figure 10:
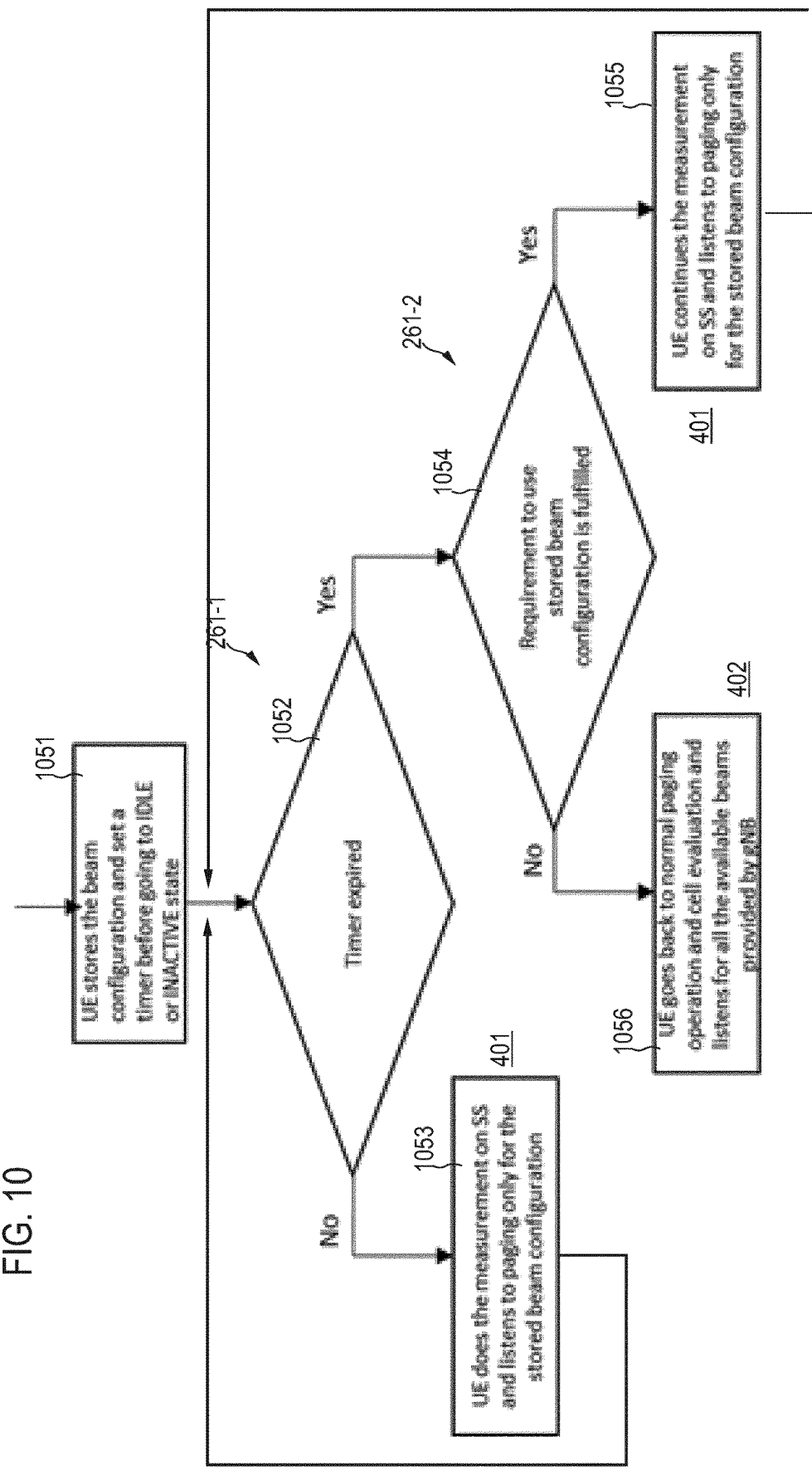
FIG. 10 is a flowchart according to various examples illustrating multiple predefined events.

FIG. 10 schematically illustrates aspects with respect to predefined events 261-1, 261-2 that can trigger a fallback to a more conservative RX beam configuration such as the further RX beam configuration 402 at the UE when monitoring for DL signals in a disconnected mode 302, 303. FIG. 10 is a flowchart of a method according to various examples.

Initially, at block 1051, the UE 90 stores the RX beam configuration 401 used in connected mode 301. The UE 90 also sets the timer value of the beam validity timer 262 (cf. FIG. 9). Optionally, the UE 90 may transmit—e.g., to the BS 102—an indicator indicative of the use of the stored RX beam configuration 401 when monitoring for DL signals 4003-4005 in the disconnected mode 302, 303 to be activated. Thus, in other words, the UE 90 may signal, to the cellular network 100, use of the beam configuration inheritance. Optionally, the UE 90 may also transmit an indicator indicative of the timer value of the beam validity timer 262. The UE 90 may thus signal one or more parameters of the beam configuration inheritance.

Then, the UE 90 transitions from the connected mode 301 to a disconnected mode 302, 303, e.g., due to expiry of a corresponding inactivity timer 201 (cf. FIG. 3). Then, the UE 90 operates in the disconnected mode 302, 303. This operation may include implementing a DRX 292. During ON-durations of a DRX cycle of the DRX 292, the UE may monitor for DL signals—e.g., DL reference signals 4003 and/or DL paging signals 4004, 4005—using the stored RX beam configuration 401.

Then, at block 1052, the UE 90 checks for occurrence of a first predefined event 261-1, here the expiry of the beam validity timer 262. If the beam validity timer 262 has not yet expired, then, the method commences in block 1053. In block 1053, the UE monitors for DL reference signals 4003 to perform channel measurements on the communication quality of the wireless link 114 (sometimes also referred to as channel sounding). Alternatively or additionally, the UE 90 monitors for paging indicators 4004 and/or paging messages 4005. All this monitoring is done using the stored RX beam configuration 401 inherited from the operation in the connected mode 301. After performing block 1053, block 1052 is re-executed.

If, at block 1052, expiry of the beam validity timer 262 is detected, the method commences with block 1054. At block 1054, the UE 90 checks for occurrence of a second predefined event 261-2, here, one or more other requirements that mandate the use of a further RX beam configuration 402. Specifically, at block 1054, the UE 90 may check whether the channel sounding performed based on DL reference signals 4003 received using the stored RX beam configuration 401 indicates a degraded communication quality on the wireless link 114. For instance, the UE 90 may check whether the receive strength and/or the receive quality of the DL reference signals 4003 has fallen below a predefined threshold.

If the receive strength and/or the receive quality has not fallen below the predefined threshold, the requirement to use the stored RX beam configuration 401 continues to be fulfilled. Hence, block 1055 is executed. Here, the UE 90 re-initializes the beam validity timer 262 and continues to monitor for the DL signals 4003-4005 with the stored RX beam configuration 401. The beam validity timer 262 may be reinitialize to 0 or another starting value. Then, block 1052 is re-executed.

On the other hand, if the receive strength and/or the receive quality has fallen below the predefined threshold, the requirements use the stored RX beam configuration 401 are not fulfilled, any more. Then, block 1056 is executed. Here, the UE 90 selects the further RX beam configuration 402 (that may be, hence, labeled as fallback RX beam configuration) and monitors for the DL signals 4003-4005 with the further RX beam configuration 402. Typically, using the further RX beam configuration 402, the UE 90 can monitor for all available TX beams 461-468 of the BS 102 (cf FIG. 6).

Above, techniques have been described according to which the configuration of the DRX 292 during disconnected mode 302, 303 is adjusted along with the choice of the RX beam configuration 401, 402. Alternatively or additionally to such correlation between the configuration of the DRX 292 and the choice of the RX beam configuration 401, 402, it would also be possible to adjust a paging configuration along with the choice of the RX beam configuration 401, 402. Details with respect to the paging configuration are illustrated in connection with FIG. 11.

Figure 11:
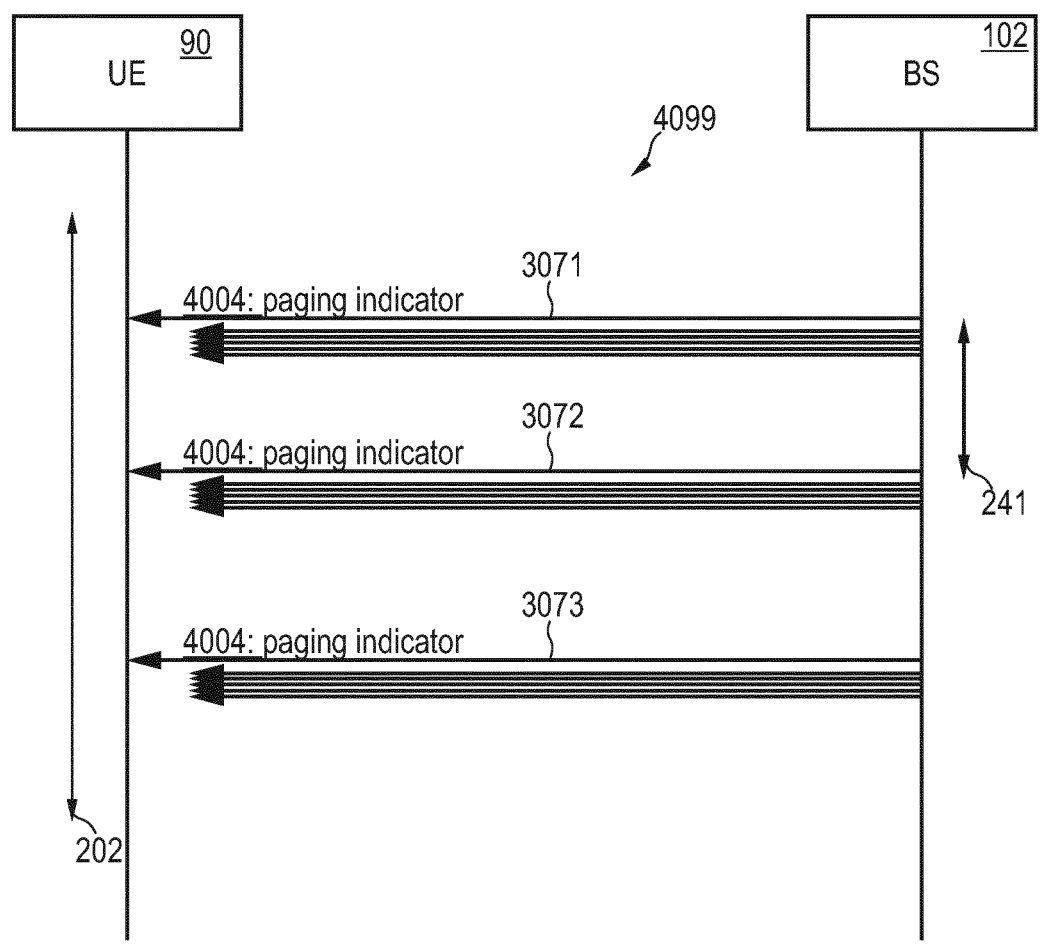
FIG. 11 is a signaling diagram illustrating a paging configuration according to various examples.

FIG. 11 illustrates aspects with respect to an example paging configuration 4099. The paging configuration 4099, in the illustrated example, defines a repetition number of transmission of the paging indicators 4004 and/or the appropriate TX beam configuration for transmission of the paging indicators 4003; but may generally define other or further parameters of the paging (e.g., coverage enhancement repetition level; type of paging signal used, e.g., in terms of modulation and coding scheme, etc.).

In some examples, the paging configuration 4099 may be static. I.e., the BS 102 may not adjust the paging configuration 4099 depending on whether or not the UE 90 employs RX beam configuration inheritance and/or depending on the particular RX beam configuration employed by the UE 90. In other examples, it would be possible that the BS 102 selects an appropriate paging configuration 4099 from multiple paging configuration 4099, e.g., depending on whether the UE employs RX beam configuration inheritance and/or depending on the particular RX beam configuration employed by the UE 90.

FIG. 11 is a signaling diagram of communication between the UE 90 and the BS 102. FIG. 11 illustrates the communication during a PO 202. In the example of FIG. 11, the paging configuration 4099 defines a repetition number of three for the paging indicators 4004. The paging configuration 4099 also defines, in the example of FIG. 11, the use of TX beams at the BS 102 for the various paging indicators. Hence, the paging indicator 4004 is transmitted three times by the BS 101, each times on a different TX beam (cf. FIG. 8) with a respective time gap 241 in between. It is noted that for each transmission of the paging indicator 4004 multiple signal repetitions can be implemented under a coverage enhancement policy. The timescale of the signal repetitions under the coverage enhancement policy is much shorter than the timescale of the time gap 241.

For instance, it would be possible to use a larger or smaller repetition number of transmission of the paging indicator 4004 for the inherited RX beam configuration 401 if compared to the further RX beam configuration 402 that includes more RX beams 411-414. Thereby, if reception of the paging indicator 4004 fails at the first repetition, then, there is a chance that it succeeds for a second repetition.

Figure 12:
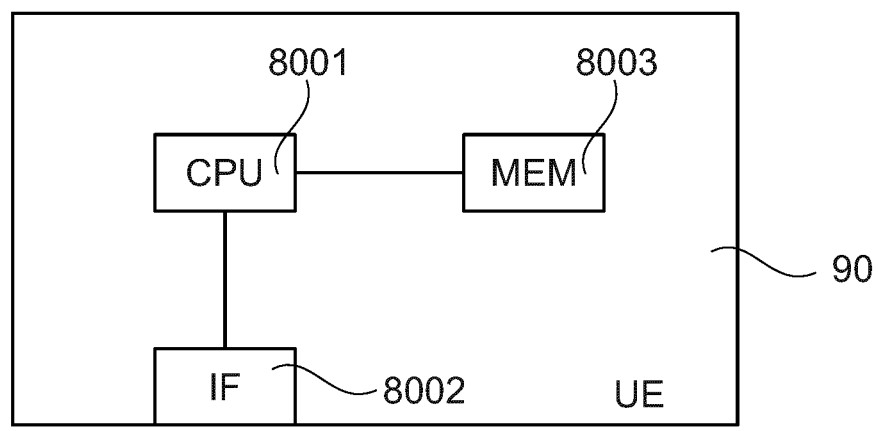
FIG. 12 schematically illustrates the UE according to various examples.

FIG. 12 schematically illustrates the UE 90 according to various examples. The UE 90 includes a processor 8001, a wireless interface 8002, and a non-volatile memory 8003. The wireless interface 8002 includes a receiver circuitry and a transmitter circuitry (not illustrated in FIG. 12). The processor 8001 can load program code from the memory 8003 and then execute the program code. Executing the program code causes the processor 8001 to perform techniques as described herein, e.g., with respect to: operating in connected mode; operating in disconnected mode; monitoring for DL signals and disconnected mode with a given RX beam configuration of a plurality of RX beam configurations; activating different RX beam configuration; using different paging configuration; using DRX; et cetera.

Figure 13:
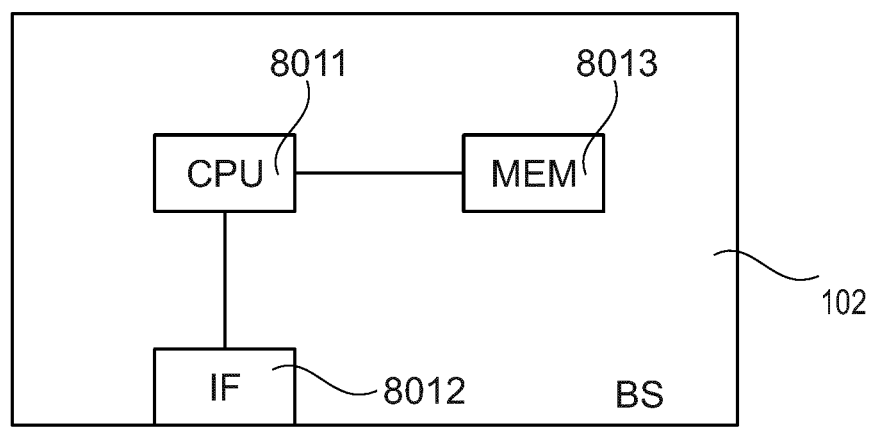
FIG. 13 schematically illustrates a base station (BS) of the cellular network according to various examples.

FIG. 13 schematically illustrates a node of the network 100, e.g., the BS 102 or the AMF 131 or the SMF 132 according to various examples. The node 102, 131, 132 includes a processor 8011, a wireless interface 8012, and a nonvolatile memory 8013. The wireless interface 8012 includes a receiver circuitry and a transmitter circuitry (not illustrated in FIG. 13. The processor 8011 can load program code from the memory 8013 and then execute the program code. Executing the program code causes the processor 8011 to perform techniques as described herein, e.g., with respect to: communicating with a UE operating in connected mode; communicating with a UE operating in disconnected mode; transmitting DL signals while the UE operates in disconnected mode with a TX beam configuration including multiple TX beams and implementing a beamsweep; activating different TX beam configurations; using different paging configurations for paging the UE; communicating with the UE using DRX; etc.

Figure 14:
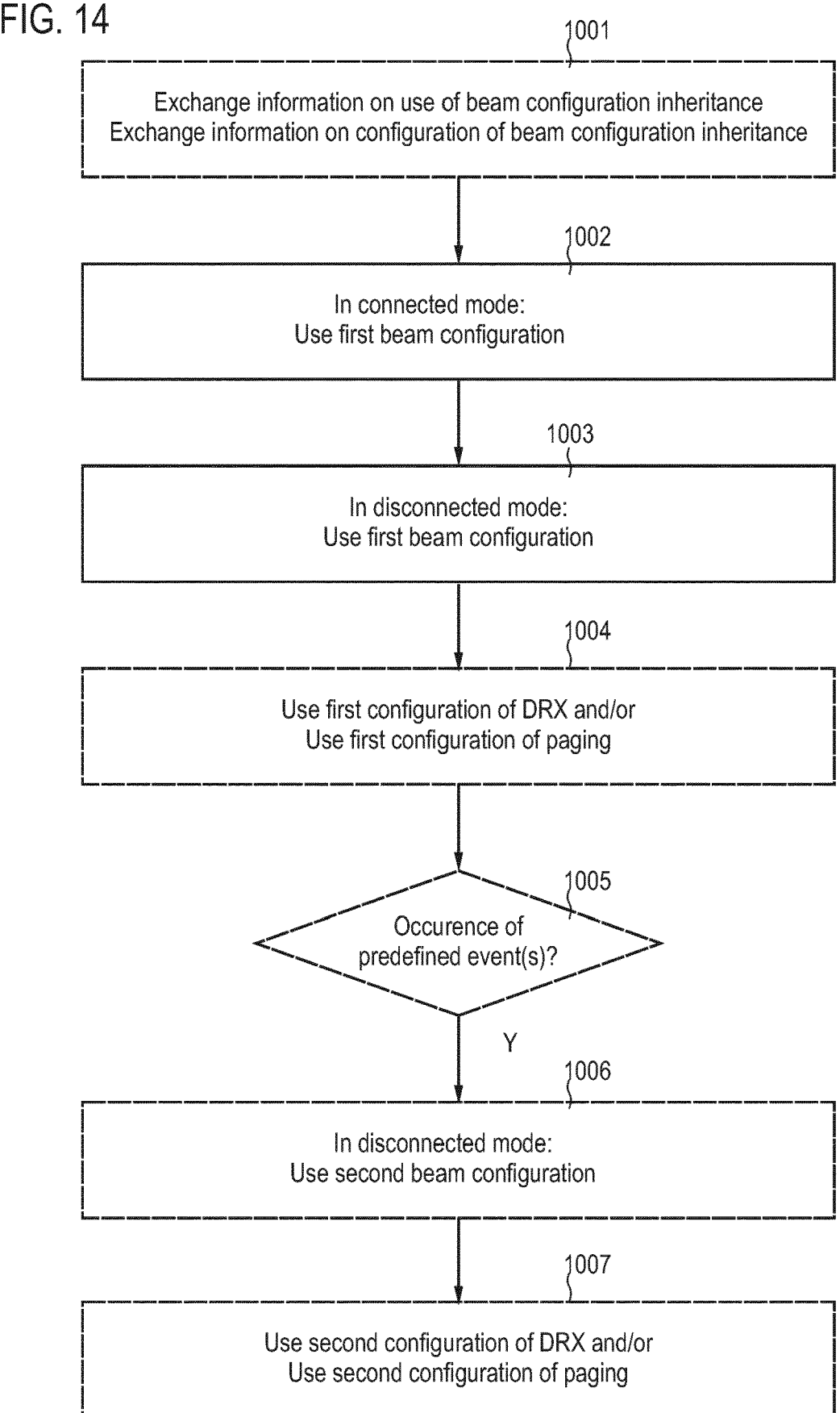
FIG. 14 is a flowchart of a method according to various examples.

FIG. 14 is a flowchart of a method according to various examples. For example, the method of FIG. 14 may be executed by a UE. For instance, the method may be executed by the processor 8001 of the UE 90 based on program code loaded from the memory 8003. In FIG. 14, optional blocks are illustrated with dashed lines Initially, at optional block 1001, the UE exchanges, with a communications network, information on the use of beam configuration inheritance (activated vs. not activated) and optionally one or more parameters of the beam configuration inheritance, i.e., a configuration of the beam configuration inheritance.

Such exchange may take different forms in different examples. In a simple example, the UE may decide upon using or not using the beam configuration inheritance and transmit a corresponding indicator indicative of whether a RX beam configuration stored while operating in connected mode will be re-used for monitoring for DL signals in disconnected mode. In another example, it would be possible that a node of the communications network (e.g., a control-plane node such as the AMF 131 or the SMF 132, or the BS 102, cf. FIG. 1) decides upon using or not using the beam configuration inheritance and transmits a corresponding indicator indicative of whether the RX beam configuration stored while operating in connected mode shall be used for monitoring for signals in disconnected mode. In yet other examples, the exchange may implement a two-way negotiation. Here, UL and DL signaling may be employed to agree upon, between the UE and the communications network, whether to use or not use the beam configuration inheritance. A proposal/confirmation scheme may be used.

Similar considerations also apply for the exchange of the configuration of the beam configuration inheritance. For instance, the UE may transmit an indicator indicative of a timer value of a beam validity timer defining a predefined event until which the inherited RX beam configuration will be used.

Corresponding information may be maintained in a UE context of the UE at the communications network.

Control signaling as part of block 1001 may be implemented using RRC control messages while the UE operates in connected mode.

In block 1002, a first RX beam configuration is used and stored. This means that the UE monitors for signals with the first RX beam configuration. For instance, the UE may monitoring for signals on PDSCH or PDCCH.

Then, the UE transitions from the connected mode to the disconnected mode, e.g., idle mode or inactive mode or another power-saving mode. In block 1003, the UE continues to use the stored RX beam configuration also used in block 1002 when operating in connected mode (beam configuration inheritance). This means that the UE monitors for signals with the first RX beam configuration. For instance, the UE may monitor for DL reference signals and/or paging signals.

In some examples, it is possible that the use of the first beam configuration in block 1003 also triggers use of an associated first configuration of DRX and/or triggers use of an associated first paging configuration, see optional block 1004. For instance, a comparably short ON-duration of the DRX may be activated in accordance with the first configuration of the DRX. Alternatively or additionally, multiple repetitions of paging signals per PO can be used when monitoring for paging signals.

In optional block 1005, occurrence of one or more predefined events is detected. Example predefined events may include expiry of a timer and degradation of a received strength or a receive quality of DL reference signals below a predefined threshold when monitoring with the first RX beam configuration.

A further example predefined event may specify the change of an orientation of the UE, e.g., if compared to a predefined threshold. For instance, the change rate may be considered, i.e., the change of orientation per time unit—a rotational acceleration or rotational velocity. For instance if the orientation of the UE changes more than X°, the predefined event may be detected, wherein X may be e.g., in the range of 20° to 60°. For instance, the change of the orientation may be monitored with an acceleration sensor etc. of the UE. Yet a further predefined event may specify acceleration, e.g., a translational/linear acceleration compared to a predefined threshold. Again this may be measured using an acceleration sensor of the UE.

If occurrence of the one or more predefined events is detected at block 1005, then, in subsequent block 1006, the UE uses a second RX beam configuration when operating in disconnected mode, different from the inherited first beam configuration used in block 1003. For instance, a set of beams of the second RX beam configuration may at least partly be non-overlapping with a set of beams of the first RX beam configuration. This means, that the first RX beam configuration and the second RX beam configuration may at least be different with respect to one or more beams. Typically, the set of beams of the second RX beam configuration may include more beams than the set of beams of the first RX beam configuration. For example, the second RX beam configuration may define a beamsweep—e.g., to monitor for DL signals on all available TX beams—while the first RX beam configuration may not define a beamsweep.

Again, it is possible that the use of the second RX beam configuration at block 1006 triggers use of an associated second configuration of the DRX at the UE and/or triggers use of an associated second configuration of paging at the UE, block 1007. The second configuration of the DRX of block 1007 may be different from the first configuration of the DRX at block 1004. The second configuration of the paging at block 1007 may be different from the first configuration of the paging at block 1004.

Figure 15:
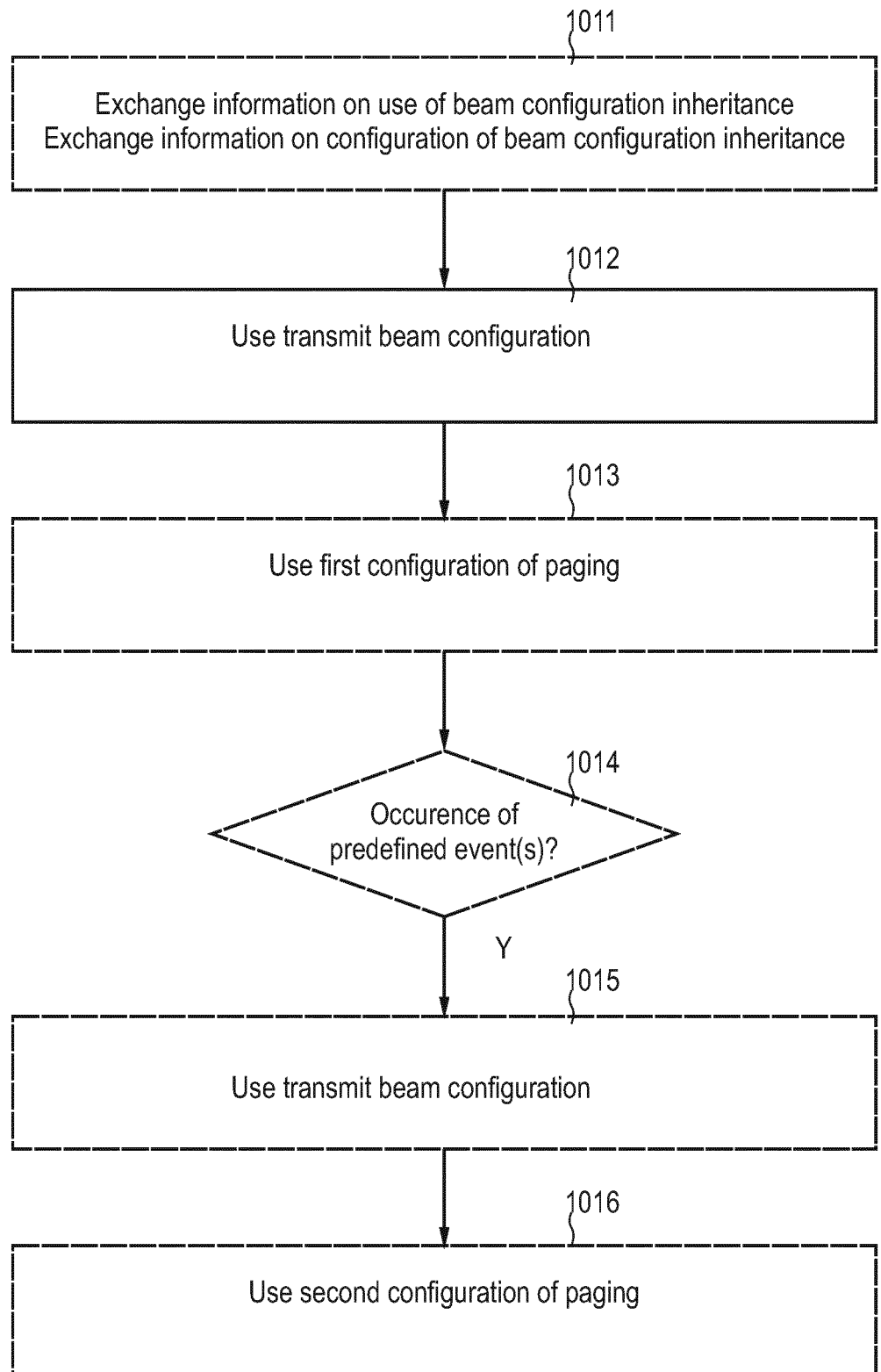
FIG. 15 is a flowchart of a method according to various examples.

FIG. 15 is a flowchart of a method according to various examples. For example, the method of FIG. 15 may be executed by a node of a communications network, e.g., a CN node (e.g., the AMF 131 or the SMF 132 in a 3GPP NR scenario, cf. FIG. 1) or an access node, such as the BS 102. For instance, the method may be executed by the processor 8011 of the BS 102 based on program code loaded from the memory 8015. In FIG. 15, optional blocks are illustrated with dashed lines.

Initially, in optional block 1011, use of beam configuration inheritance and, optionally, a configuration of the beam configuration inheritance is exchanged between the node and a UE. As such, block 1011 is inter-related with block 1001 (cf. FIG. 14).

Then, at block 1012, a TX beam configuration is used or triggered to be used to transmit one or more signals to the UE. Paging of the UE is thus triggered. For instance, DL RSs and/or DL paging signals may be transmitted. For instance, the TX beam configuration may include multiple beams and may implement a beamsweep (cf. FIG. 6 and FIG. 8). Block 1012 is inter-related with block 1003 (cf. FIG. 14).

In optional block 1013, it would be possible to use a first paging configuration. As such, block 1013 is inter-related with block 1004 (cf. FIG. 14). The paging configuration can define the number of repetitions of a paging signal per PO (cf. FIG. 11).

Next, in optional block 1014, occurrence of a predefined event is detected. For instance, the detection of the occurrence of the predefined event may correspond to expiry of a beam validity timer. Here, it would be possible that the timer value of the beam validity timer is set in accordance with the exchange at block 1011. The beam validity timer may be initialized at the node when the UE transitions from the connected mode to the idle mode (not illustrated in FIG. 15, but explained in detail with respect to, e.g., FIG. 3).

Then, while the same TX beam configuration is continued to be used in block 1015, in block 1016 a second paging configuration may be used that is different from the first paging configuration used in block 1013.

Summarizing, above, techniques have been described that add flexibility and simplify the UE monitoring of the wireless link and corresponding measurements. The UE power consumption can be reduced when the UE moves from a connected mode to a disconnected mode.

Channel measurements and paging monitoring can be relaxed by allowing the UE to perform the measurements/channel monitoring on a single beam or a subset of multiple beams, during disconnected mode. It is possible that the respective beam configuration is inherited from connected mode. The usage of a beam validity timer for which the UE takes the benefit of the relaxed measurements and paging monitoring is possible. As illustrated above, it is possible that the UE indicates that such beam configuration inheritance is to be performed. In some examples, a fallback can be implemented which allows the UE to be paged multiple times. Alternatively or additionally, upon occurrence of a certain predefined criteria, a legacy beam configuration can be employed including multiple beams and possibly implementing a beamsweep.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For instance, while various examples have been described in which a RX beam configuration used by the UE when operating in the connected mode is inherited for use by the UE in the disconnected mode, in other examples it would be possible that the RX beam configuration used by the UE when beginning operation in the disconnected mode—i.e., upon a transition from the connected mode to the disconnected mode—varies to some larger or smaller degree from the RX beam configuration used by the UE while still operating in the connected mode. For instance, it would be possible to determine the RX beam configuration used by the UE in response to transitioning from operation in the connected mode to operation in the disconnected mode based on a further RX beam configuration used by the UE prior to transitioning from operation in the connected mode to operation in the disconnected mode. Here, certain specifics of the disconnected mode may be taken into account when determining the respective RX beam configuration. In some examples, it may even be possible that the RX beam configuration used by the UE when operating in the disconnected mode upon transitioning from operation in the connected mode is different from the RX beam configuration used by the UE when operating in the connected mode prior to transitioning to the disconnected mode. In such a scenario, benefits may still be achieved by using a comparably simple RX beam configuration until occurrence of at least one predetermined event, upon which a fallback to a more comprehensive RX beam configuration may be made.

The invention claimed is:

1. A method of operating a wireless communication device, comprising:
   monitoring for signals from a communications network in a connected mode of the wireless communication device with a receive beam configuration, storing the receive beam configuration, and monitoring for further signals from the communications network in a disconnected mode of the wireless communication device with the stored receive beam configuration, wherein the further signals are monitored in the disconnected mode with the stored receive beam configuration until occurrence of at least one predefined event, and wherein the at least one predefined event comprises a receive strength or a receive quality of the further signals falling below a predefined threshold when monitoring for the further signals with the stored receive beam configuration.

2. The method of claim 1,
wherein the at least one predefined event comprises an expiry of a timer initialized upon transitioning from the connected mode to the disconnected mode.

3. The method of claim 2, further comprising:
setting a timer value of the timer based on at least one of a mobility state of the wireless communication device, an orientation state of the wireless communication device, and a configuration received from the communications network.

4. The method of claim 3, further comprising:
transmitting an indicator indicative of the timer value to the communications network in the connected mode.

5. The method of claim 1,
wherein the at least one predefined event further comprises expiry of a timer initialized upon transitioning from the connected mode to the disconnected mode,
wherein the method further comprises:
upon the expiry of the timer, checking if the receive strength or the receive quality of the further signals has fallen below the predefined threshold, and
if the receive strength or the receive quality of the further signals has not fallen below the predefined threshold, re-initializing the timer and continuing to monitor the further signals with the stored receive beam configuration.

6. The method of claim 1, further comprising:
monitoring for the further signals in the disconnected mode with a further receive beam configuration after the occurrence of the at least one predefined event,
wherein the further receive beam configuration is different from the stored receive beam configuration.

7. The method of claim 6,
wherein the stored receive beam configuration comprises a first set of one or more receive beams selected from a plurality of receive beams,
wherein the further receive beam configuration comprises a second set of one or more receive beams selected from the plurality of receive beams,
wherein the first set and the second set are at least partially non-overlapping, and
wherein a count of beams in the first set is smaller than a count of beams in the second set.

8. The method of claim 6,
wherein the further signals comprise paging signals,
wherein the method further comprises:
using a first paging configuration for monitoring for the paging signals while monitoring for the paging signals using the stored receive beam configuration until the occurrence of the at least one predefined event, and
using a second paging configuration for monitoring for the paging signals while monitoring for the paging signals using the further receive beam configuration after the occurrence of the at least one predefined event,
wherein the first paging configuration is different from the second paging configuration.

9. The method of claim 1,
wherein the at least one predefined event comprises at least one of a change of orientation of the wireless communication device and an acceleration of the wireless communication device.

10. The method of claim 1, further comprising:
based on the stored receive beam configuration and a transmit beam configuration of an access node of the communications network, configuring a discontinuous reception of a receiver circuitry of the wireless communication device when monitoring for the further signals with the stored receive beam configuration.

11. The method of claim 10,
wherein the discontinuous reception is configured to time-align one or more receive beams of the stored receive beam configuration with one or more transmit beams of the transmit beam configuration.

12. The method of claim 10,
wherein the further signals are monitored in the disconnected mode with the stored receive beam configuration until occurrence of at least one predefined event,
wherein the method further comprises:
monitoring for the further signals in the disconnected mode with the further receive beam configuration after the occurrence of the at least one predefined event,
wherein the receiver is configured to monitor the further signals with the stored receive beam configuration for a first duration per reception cycle of the discontinuous reception,
wherein the receiver is configured to monitor the further signals with the further receive beam configuration for a second duration per reception cycle of the discontinuous reception, and
wherein the second duration is longer than the first duration.

13. The method of claim 1,
wherein the further signals comprise at least one of reference signals and paging signals.

14. The method of claim 1, further comprising:
transmitting, to an access node of the communications network, an indicator indicative of use of the stored receive beam configuration when monitoring for the further signals in the disconnected mode.

15. A method of operating a node of a communications network, comprising:
receiving, from a wireless communication device, an indicator indicative of the wireless communication device using a receive beam configuration during a connected mode and a disconnected mode of the communication device,
setting a paging configuration for transmitting paging signals to the wireless communication device depending on the indicator, and
triggering transmission of the paging signals to the wireless communication device in accordance with the paging configuration,
wherein the paging signals are monitored in the disconnected mode with the receive beam configuration until occurrence of at least one predefined event, and
wherein the at least one predefined event comprises a receive strength or a receive quality of the paging signals falling below a predefined threshold when monitoring for the paging signals with the receive beam configuration.

16. A method of operating a node of a communications network, comprising:
exchanging, with a wireless communication device, information on a use of a receive beam configuration of the wireless communication device during a connected mode and a disconnected mode of the wireless communication device,
monitoring further signals in the disconnected mode with a stored receive beam configuration until occurrence of at least one predefined event,
monitoring for the further signals in the disconnected mode with a further receive beam configuration after the occurrence of the at least one predefined event,
wherein the further receive beam configuration is different from the stored receive beam configuration.

* * * * *